Aug. 26, 1958     E. J. FRIEDLINE     2,848,789
CUTTING TOOLS
Filed Jan. 30, 1956     2 Sheets-Sheet 1
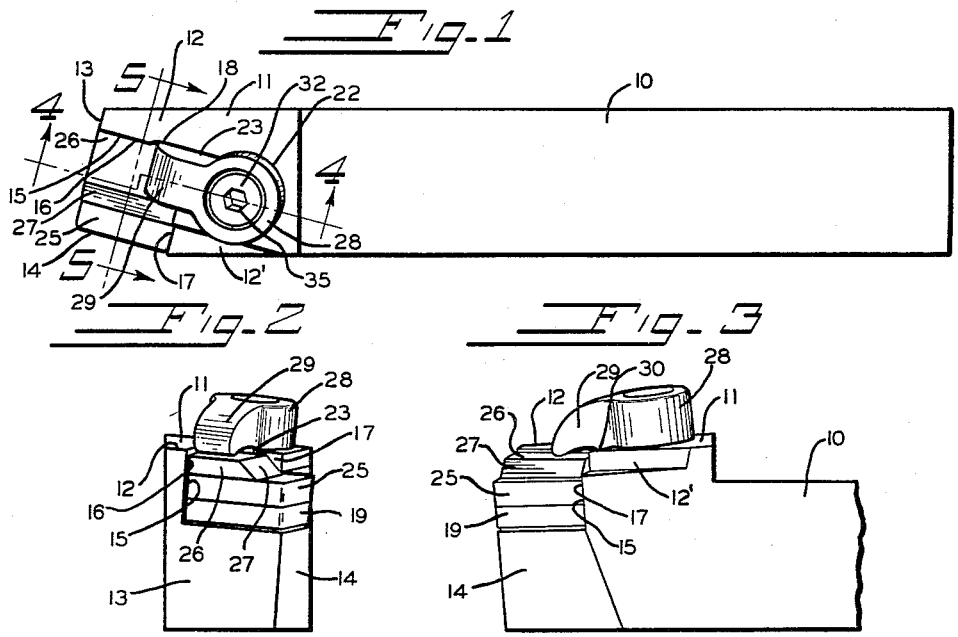
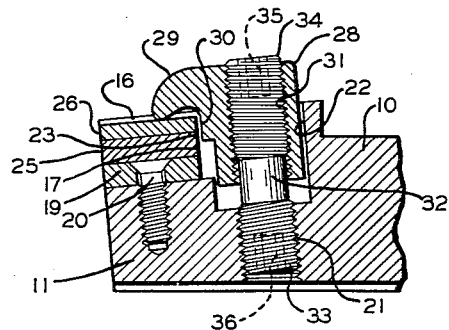
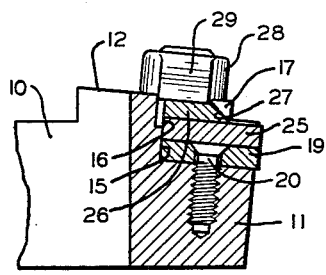
*INVENTOR.*
ERNEST J. FRIEDLINE
BY
DES JARDINS, ROBINSON & KEISER
HIS ATTORNEYS

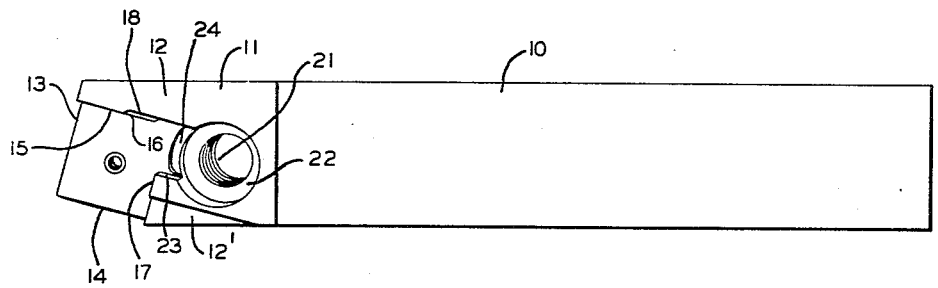
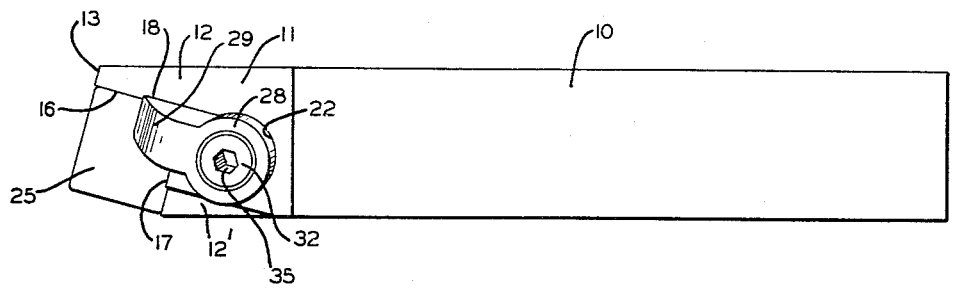
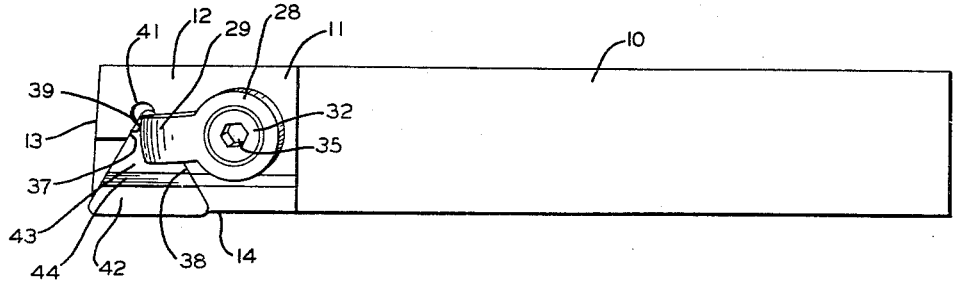

United States Patent Office 2,848,789
Patented Aug. 26, 1958

2,848,789

CUTTING TOOLS

Ernest J. Friedline, Mount Pleasant Township, Westmoreland County, Pa., assignor to Kennametal Inc., Latrobe, Pa., a corporation of Pennsylvania Application January 30, 1956, Serial No. 562,212

8 Claims. (Cl. 29—96)

My invention relates to improvements in cutting tools and has to do, more particularly, with the type of cutting tool having a readily releasable and removable cutting insert. The present application is a continuation-in-part of my earlier patent application Serial No. 505,714 filed May 3, 1955 for cutting tools and now abandoned.

The principal object of my invention is to provide an inexpensive, but highly efficient, cutting tool, the cutting edge of which is provided on a cutting insert, releasably clamped in a recess in the tool holder head, so that the cutting insert can be quickly and easily released to remove the insert, or to index it to another position in the recess presenting another cutting edge to the work.

Another object of my invention is to provide such a cutting tool in which a removable chip breaker plate is clamped on the upper face of the cutting insert, in position to break up chips coming from the cutting edge.

A further object of my invention is to provide an efficient but inexpensive cutting tool, in which the means for clamping the insert to its seat may be operated from the top or bottom of the toolholder.

Further objects, and objects relating to economies and details of construction and operation, will definitely appear from the detailed description to follow. My invention is clearly defined and pointed out in the appended claims. Structures constituting preferred embodiments of my invention are illustrated in the accompanying drawings, in which:

Fig. 1 is a top plan view of a cutting tool having a square cutting insert therein.

Fig. 2 is an end view of the head of the tool shown in Fig. 1.

Fig. 3 is a side view of the head portion of the tool shown in Fig. 1.

Fig. 4 is a vertical sectional view, taken on the line 4—4 of Fig. 1.

Fig. 5 is a vertical sectional view taken on the line 5—5 of Fig. 1.

Fig. 6 is a plan view of the toolholder head, the clamp, the shim, the cutting insert and the chip breaker plate having been removed.

Fig. 7 is a plan view of a cutting tool such as shown in Fig. 1, but without the chip breaker plate, and Fig. 8 is a plan view of a cutting tool embodying my invention, but provided with a triangular cutting insert.

In the drawings, the same reference numerals refer to the same parts throughout the several views, and the sectional views are taken looking in the direction of the arrows at the ends of the section lines.

In general, the improved cutting tool of my invention comprises a toolholder having the usual shank and a head portion, the latter being provided with a recess open at the top and at two sides. The cutting insert is seated on the bottom of said recess, with two edges of the insert gauged against side walls of the recess of definitely locate the insert, and opposite edges of said insert projecting from the recess beyond the side walls of the toolholder head to present a cutting edge to the work. The cutting insert is clamped against the bottom of the recess by a releasable clamping member, which is mounted in the head alongside the recess and has a finger overhanging it, and means are provided for forcing said finger toward the bottom of the recess to exert a clamping pressure holding the insert to its seat. In cases where a chip breaker is desirable, a chip breaker plate may be positioned on the upper face of the cutting insert and engaged by the clamping finger, which transmits clamping pressure through the chip breaker plate to the insert.

Referring to the numbered parts of the drawings, my improved cutting tool comprises a toolholder, best shown in Figs. 1, 2, 3 and 6 having a shank 10 and a head portion 11. The bottom of the head portion and two of the side walls thereof are continuations in the same plane of the bottom and side walls of the shank 10. The head of the toolholder has an end wall 13, inclined at an angle of about 105° to the side wall of the shank and head, and sloping inwardly from top to bottom at an angle of about 5° to the vertical. The toolholder head also has a front side wall 14 at right angles to the wall 13. The top face 12 of the head slopes forwardly at an angle of 5° to the horizontal. A portion of the top of the head is cut away at 12', adjacent the face 14, to form a chip breaker shoulder. A recess 15 is formed in the top portion of the toolholder head 11, this recess being open at the top end at the two sides adjacent the end wall 13 and the inclined side wall 14 of the head. This recess has a side wall 16 and a back wall 17, which walls are in planes at right angles to each other and at right angles to the floor of the recess. This floor slopes downwardly toward the end wall 13 and from the side wall 16 toward the side face 14 of the head at an angle of about 5° to the horizontal. The floor of the recess 15 might form the seat for the cutting insert, but, to provide a ground bearing surface more conveniently, I prefer to form the bottom of the recess by the upper face of a shim 19, which is secured to the head 11 by a screw 20 engaging a central hole in the shim and screwed into the head. The top face of this shim will have the same slope previously described with reference to the floor of the recess. I have found it desirable to make the shim 19 of a cemented hard carbide composition.

A bore is formed in the head, adjacent the back wall 17 of the recess, and having an axis parallel to the plane of the wall 17. This bore extends completely through the head, from top to bottom and the lower portion 21 of the bore is internally threaded. The upper portion 22 of the bore is of larger diameter and not threaded. A notch 23, formed in the head, communicates with the upper portion 22 of the bore and with the recess 15. A portion of the side wall 16 of the recess is cut away to form a shoulder 18, to provide relief permitting free downward movement of the clamping finger hereinafter described, and a portion of the floor of recess 15 is cut away to form a recess 24, in line with the notch 23, for receiving a shoulder on the clamping finger.

A clamping sleeve 28 is mounted in the upper portion 22 of the bore, and is provided with a clamping finger 29 overhanging the recess 15, and a shoulder 30 adapted to engage in the notch 23 to prevent rotation of sleeve 28 in bore 22. The sleeve 28 is internally threaded at 31. A rotatable plug 32 has a lower threaded portion 33, in screw thread engagement with the threaded portion 21 of the bore. This plug has an oppositely threaded upper portion 34, in screw thread engagement with the internal threads 31 of sleeve 28. The upper end of the plug 32 has a non-circular socket 35, and the lower end of the plug has a similar socket 36, for receiving the end of a tool for turning the plug. Thus, the plug may be rotated from either top or bottom of the toolholder head.

The cutting insert 25 is seated on the upper face of the shim 19 forming the bottom of the recess 15, and this insert is accurately and precisely located by gauging two edges thereof against the side wall 16 and the back wall 17 of the recess. This cutting insert is a right parallelepipedon having square upper and lower faces of equal dimensions. As shown in the accompanying drawings, the thickness of the insert 25 is less than one-half the length of a side thereof and, specifically, is approximately one-fourth the length of a side. It is preferably made of cemented hard carbide composition of characteristics suitable for the work to which it is to be put. Seated on the upper face of the insert 25 is a chip breaker plate 26 having a flat lower face portion, two edges of which engage the walls 16 and 17 of the recess to locate the chip breaker plate. One edge or side of the chip breaker plate has a bevel 27, extending parallel to the cutting edge of the insert but spaced therefrom, and sloping upwardly from the top face of the insert. With the clamping finger 29 backed away slightly from the bottom of the recess, the cutting insert 25 and the chip breaker plate 26 may be positioned in the recess, as previously described. The operator then, by rotating the plug 32, from either the top or the bottom of the head, draws the clamping sleeve downwardly in the upper portion 22 of the bore, causing the finger 29 to engage the upper surface of the chip breaker plate 26 to clamp that plate and the insert in position in the recess. Engagement of shoulder 30 in notch 23 prevents turning of the sleeve 28, so that rotation of plug 32 in the proper direction pulls down on the clamping finger to apply the clamping pressure. By backing up the clamping sleeve 28, the insert may be removed, with the chip breaker plate, and the insert can be turned to present another of its sides as the cutting edge, whereupon by rotating the plug 32 the clamping finger engages the upper surface of the chip breaker plate to apply clamping pressure to the insert. This square insert may be turned so that any one of its four sides is presented to the work and, then, turned over and indexed in the same way. Thus, each cutting insert 25 has eight available cutting edges. When these have been used up in work, the insert is to be removed and a new insert substituted. It is not necessary or desirable to regrind these cutting edges. Due to the slope previously described of the top face of shim 19 forming the bottom of the recess, the cutting edge is always presented to the work at a 5° negative rake angle, as is desirable in accordance with current practice. It is to be noted that it is not necessary to back up the sleeve 28 so far that the shoulder 30 leaves the notch 23, in order to release clamping pressure to permit the cutting insert to be removed or changed in position.

For some kinds of cutting, a chip breaker is neither necessary nor desirable and, in such cases, the chip breaker plate 26 may be omitted and the clamping sleeve moved downwardly until the finger 29 engages the upper face of the insert 25, to clamp it against the bottom of the recess. Fig. 7 of the drawings shows a cutting tool with the chip breaker plate omitted.

I have also embodied my invention in a cutting tool employing a triangular cutting insert and one of these tools is shown in Fig. 8. In this tool, the recess formed in the head is triangular, as shown at 37, being open at the top and opening through the end face 13 and the side face 14 of the toolholder head. This triangular recess has a rear side wall 38 and a front side wall 39 with a cylindrical notch 41 provided at the meeting of the side walls 38 and 39, for relief purposes. The bottom of the recess is formed by the upper face of a triangular shim which, like the square shim 19, is preferably made of a cemented hard carbide composition, the shim being secured to the floor of the recess by a screw, as in the tool previously described. The slope of the floor of the recess and, hence, of the upper face of the shim is such as to present the cutting edge of the insert to the work at the desirable 5° negative rake angle. The cutting insert 42, of cemented hard carbide composition, has upper and lower faces in the form of equilateral triangles of equal dimensions, and the two sides of this triangular insert opposite the cutting edge are gauged against the walls 38 and 39 of the recess, to locate the insert accurately. In the case of both the square and the triangular inserts, the portion adjacent the cutting edge projects slightly beyond the recess. The chip breaker plate 43 is also of triangular form, having a bevel 44 parallel to but spaced from the cutting edge of the insert and sloping upwardly therefrom. The means for releasably clamping the insert and chip breaker in place, including the clamping sleeve 28, the finger 29 and the rotatable plug 32, are the same as described previously in connection with the form using square cutting inserts. The triangular cutting insert, which is preferably made of cemented hard carbide composition, presents six available cutting edges, that is to say, the three sides of the triangle at the upper face of the insert, and the three sides of the triangle at the lower face of the insert which are made available by turning the insert over. It is to be noted that, in the case of both the square insert and the triangular insert the corners are slightly rounded, as shown in the drawings. The triangular chip breaker plate 43 may also be omitted, if desired.

As stated above, both the cutting insert, 25 or 42, and the shim upon which the insert rests, are preferably and desirably made of a cemented hard carbide composition. This permits the application of heavier cutting loads to the insert, without breaking, than was possible in the past with inserts of the same thickness. This is because of the greater stiffness of the hard carbide composition shim. This results from the fact that the cemented hard carbide composition, used for shim and insert, has a modulus of elasticity from two to three times that of steel. Hence, steel will deflect two to three times as much as the hard carbide under the same loading. Assume a hard carbide insert of one-eighth inch thickness. A given cutting load may cause the carbide insert to deflect beyond its elastic limit, while well within the elastic limit of the steel backing up the insert. The consequence would be the cracking of the insert. To carry the cutting load without cracking, the insert, when backed up by steel, would have to be increased in thickness, say to one-fourth inch, to give it the necessary stiffness. However, a hard carbide cutting insert one-eighth inch thick, backed up by a hard carbide shim one-eighth inch thick, as shown herein, has a stiffness equivalent to an insert of one-fourth inch thickness. This arrangement of hard carbide shim backing up a hard carbide insert is advantageous, because it permits the successful use of a smaller and less expensive insert for heavier cutting loads. The insert is the expendable portion of the tool, intended to be discarded when the cutting edges are worn out. On the other hand, the shim forms part of the tool, and will outlast many inserts. Thus, the expendable unit can be cut down in size without impairing the ability of the tool to take heavy cutting loads.

I am aware that my improved cutting tool is susceptible of considerable variation without departing from the spirit of the invention and, therefore, I claim my invention broadly as indicated by the appended claims.

Having thus described my invention, what I claim as new and useful, and desire to secure by United States Letters Patent, is:

1. A cutting tool comprising a toolholder having a shank and a head, said head being provided with a recess open at the top and two sides, and having a bottom lying in a single plane normal to the sides of the recess, a cutting insert having parallel top and bottom faces in the form of regular polygons of equal dimensions, each face lying in a single plane, and the bottom face seated on the bottom of said recess with two edges of the insert gauged against side walls of said recess and portions of said insert projecting from said recess beyond side walls of the toolholder head, the thickness of said cutting insert being less than half the length of a side of a face thereof, a chip breaker plate having a flat lower face portion releasably seated on the upper face of said insert, a releasable clamping member mounted in said head alongside said recess and having a finger overhanging said recess and engaging the upper face of said chip breaker plate, and means for forcing said finger toward the bottom of said recess to exert a clamping pressure on the chip breaker plate transmitted thereby to the upper face of said cutting insert, to hold the insert to its seat on the bottom of the recess.

2. The cutting tool of claim 1 in which the cutting insert has square upper and lower faces of equal dimensions.

3. The cutting tool of claim 1 in which the cutting insert has upper and lower faces in the form of equilateral triangles of equal dimensions.

4. A cutting tool comprising a toolholder having a shank and a head, said head being provided with a recess open at the top and two sides, and having a bottom lying in a plane normal to the sides of said recess, a shim of cemented hard carbide composition having its lower face seated on the bottom of said recess with its upper face normal to the side walls of the recess, a cutting insert of cemented hard carbide composition having parallel top and bottom faces in the form of regular polygons of equal dimensions, each face lying in a single plane and the bottom face being seated on the upper face of said shim with two edges of the insert gauged against side walls of the recess and opposite edges of said insert projecting from said recess beyond side walls of the toolholder head, the thickness of said insert being less than half the length of a side of a face thereof, and releasable means for clamping said insert to its seat on said shim.

5. The cutting tool of claim 1 in which the chip breaker plate has edges perpendicular to the flat lower face of said plate and at least one of said edges of the chip breaker plate is gauged against a side wall of said recess.

6. The cutting tool of claim 1 in which the chip breaker plate has edges perpendicular to the flat lower face of said plate and the edges on two sides of the chip breaker plate are gauged against the side walls of said recess.

7. A cutting tool comprising a tool holder having a shank and a head, said head being provided with a recess open at the top and on two sides, and having a bottom lying in a plane normal to the sides of said recess, a cutting insert of hard material having a modulus of elasticity of substantially twice that of steel or greater, said insert having parallel top and bottom faces each lying in a single plane and each having the form of a regular polygon of equal dimensions, a shim of hard material having a modulus of elasticity at least as great as that of said insert and having its lower face seated on the bottom of said recess and its upper face normal to the side walls of the recess, said cutting insert having its bottom face seated on the upper face of said shim with two edges of the insert gauged against side walls of the recess and with opposite edges of said insert projecting from said recess beyond the sides of the tool holder head, the thickness of said insert being less than half the length of a side of a face thereof, and releasable means for clamping said insert to its seat on said shim.

8. The cutting tool of claim 7 in which said shim is of cemented hard carbide composition.

References Cited in the file of this patent

UNITED STATES PATENTS

| | | |
|---|---|---|
| 2,062,607 | Reaney | Dec. 1, 1936 |
| 2,166,826 | Shepherd | July 18, 1939 |
| 2,632,536 | Skeel | Mar. 24, 1953 |
| 2,645,844 | Longe | July 21, 1953 |
| 2,675,604 | Plummer | Apr. 20, 1954 |
| 2,690,610 | Begle et al. | Oct. 5, 1954 |
| 2,697,866 | Greenleaf | Dec. 28, 1954 |

FOREIGN PATENTS

| | | |
|---|---|---|
| 695,778 | Great Britain | Aug. 19, 1953 |
| 989,307 | France | May 23, 1951 |